United States Patent
Ando

(10) Patent No.: US 6,234,034 B1
(45) Date of Patent: May 22, 2001

(54) LINEAR ACTUATOR WITH DROP PREVENTION MECHANISM

(75) Inventor: Tatsuya Ando, Kyoto (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/396,043

(22) Filed: Sep. 15, 1999

(30) Foreign Application Priority Data

Sep. 18, 1998 (JP) .................................................. 10-264743

(51) Int. Cl.$^7$ .................................................. F16H 25/20
(52) U.S. Cl. .................................... 74/89.15; 74/424.8 R; 74/459; 187/267; 254/98
(58) Field of Search ............. 74/89.15, 424.8 R, 74/459; 187/267, 268; 254/98

(56) References Cited

U.S. PATENT DOCUMENTS

| 2,187,390 | * | 1/1940 | Anderson et al. | 187/268 |
| 3,176,963 | * | 4/1965 | Sturm | 254/103 |
| 3,309,060 | * | 3/1967 | Villars | 187/267 X |
| 3,468,401 | * | 9/1969 | Letz | 187/268 |
| 3,687,234 | * | 8/1972 | Gendreau | 187/267 |
| 3,833,092 | * | 9/1974 | Flinchbaugh | 187/268 X |
| 4,279,329 | * | 7/1981 | Gehron | 187/267 |
| 4,644,811 | * | 2/1987 | Tervo | 187/267 X |
| 4,984,657 | * | 1/1991 | Burns | 74/89.15 X |
| 5,755,310 | * | 5/1998 | Wourms | 187/267 |

* cited by examiner

Primary Examiner—Allan D. Herrmann
(74) Attorney, Agent, or Firm—Dann, Dorfman, Herrell and Skillman, P.C.; Henry H. Skillman

(57) ABSTRACT

A linear actuator including a mechanism for preventing accidental drop of an inner cylinder caused when a driven nut engaged with a drive screw shaft is broken. The drop prevention mechanism includes a drop prevention nut threaded with the drive screw shaft in close proximity to the driven nut, a shear pin secured at one end to one of the drop prevention nut and the inner cylinder or the driven nut, and a shear pin guide groove formed in the other of the drop prevention nut and the inner cylinder or the driven nut for slidably receiving a projecting free end portion of the shear. When the inner cylinder and the driven nut is displaced in a direction of a load acting on the inner cylinder, the shear pin is broken or sheared by engagement with an end wall of the shear pin guide groove. Upon shearing of the shear pin, the drop prevention nut supports thereon the inner cylinder or the driven nut to thereby keep the inner cylinder in position against drop.

5 Claims, 4 Drawing Sheets

LINEAR ACTUATOR WITH DROP PREVENTION MECHANISM

BACKGROUND OF THE INVENTION

1. Field of the Invention

The present invention relates generally to a screw-driven linear actuator having an inner cylinder mounted for projection and retraction with respect to an outer cylinder so as to hoist or lower heavy things. More particularly, this invention relates to a linear actuator equipped with a mechanism for preventing an inner cylinder from dropping when a driven nut, which is threaded with a drive screw shaft for linear reciprocating movement of the inner cylinder, is damaged or otherwise broken.

2. Description of the Related Art

Conventionally, screw-driven linear actuators having an inner cylinder provided for projection and retraction with respect to an outer cylinder are widely used for hoisting or lowering heavy things. The outer cylinder is fixed to a housing, and the inner cylinder is telescopically connected to the outer cylinder so that the inner cylinder can move to project from and retract within the outer cylinder while a load, such as a heavy thing, is supported by the inner cylinder.

The housing is provided with a drive screw shaft driven for rotation in both forward and reverse directions at a fixed position by means of a rotating drive source such as a motor. The drive screw shaft is threaded with a driven nut fixed to the inner cylinder so that upon rotation of the drive screw shaft, the inner cylinder is moved to project from or retract within the outer cylinder.

The drive screw shaft is made of steel, and the driven nut threaded with the drive screw shaft is made of brass casing which is softer than steel. The conventional linear actuator of the foregoing construction may encounter a problem that the driven nut is broken due to fatigue caused by continuous use under loaded condition, or the driven nut becomes disengaged from the drive screw nut due to wearing-out of an internal screw thread of the driven nut.

Another problem is that when the inner cylinder is subjected to an overload which is in excess of an allowable maximum load of the linear actuator, the driven nut may be damaged or otherwise broken, allowing the inner cylinder to drop abruptly. If such a sudden dropping of the inner cylinder occurs during lifting or lowering operation of the heavy loads, it will result in a serious accident.

SUMMARY OF THE INVENTION

It is accordingly an object of the present invention to provide a linear actuator including a mechanism which is capable of preventing an inner cylinder from dropping under loaded condition when a driven nut threaded with a drive screw shaft is damaged or otherwise broken.

To accomplish the above-mentioned object, the present invention provides a linear actuator comprising: a housing; an outer cylinder firmly secured to the housing; an inner cylinder fitted in the outer cylinder such that the inner cylinder can project from and contract within the outer cylinder while it is prevented from rotating relative to the outer cylinder; a driven screw shaft rotatably supported by the housing and driven by a rotating drive source for rotation at a fixed position; and a driven nut secured to the inner cylinder and threaded with the drive screw shaft for causing the inner cylinder to project from or retract within the outer cylinder in response to rotation of the drive screw shaft. The linear actuator further includes a drop prevention nut threaded with the drive screw shaft in proximity to the driven nut, and a shear pin secured at one end to, and projecting in a radial direction from, one of the drop prevention nut and the inner cylinder or the driven nut. The other of the drop prevention nut and the inner cylinder or the driven nut has an axial shear pin guide groove in which a projecting free end portion of the shear pin is slidably received. The shear pin is designed to be sheared by engagement with an end wall of the shear pin guide groove when the inner cylinder and the driven nut are displaced relative to the drop prevention nut in a direction of a load acting on the inner cylinder. Upon shearing of the shear pin, the drop prevention nut supports thereon the inner cylinder or the driven nut to thereby keep the inner cylinder in position against drop.

In normal conditions, when the drive screw shaft is rotated in the forward or the reverse direction by the rotating drive source, the driven nut engaged with the drive screw shaft moves backwards or forwards along the drive screw shaft to thereby cause retraction projection of the inner cylinder with respect to the outer cylinder for achieving lifting of heavy loads or things.

In this instance, since the drop prevention nut is held non-rotatable by the shear pin slidably fitted in the shear pin guide groove, the drop prevention nut moves along the drive shaft in unison with the driven nut. During that time, the shear pin, which is slidable along the shear pin guide groove, is not subjected to thrust forces or loads. All the loads acting on the inner cylinder are born by the driven nut and, hence, the drop prevention nut is kept substantially free from wear.

When the driven nut is showing wear or damage sustained from continuous use, the driven nut is lowered relative to the drop prevention nut under the effect of thrust forces or loads acting on the inner. With this downward shift or displacement of the driven nut, the shear pin is displaced downwards along the shear pin guide groove.

When the internal screw thread of the driven nut is worn out, the driven nut is allowed to slip down along the drive screw shaft, causing sudden drop of the inner cylinder as the inner cylinder is subjected to the downward load. As a result of such sudden drop of the inner cylinder, the shear pin is broken or sheared when the projecting free end portion of the shear pin strikes against the lower end wall of the shear pin guide groove. With this shearing of the shear pin, the inner cylinder is allowed to further descending along the driven screw shaft, but the downward movement of the inner cylinder is terminated when the inner cylinder or the driven nut comes in abutment with the drop prevention nut.

The above and other objects, features and advantages of the present invention will becomes apparent to these versed in the art upon making reference to the following detailed description and accompanying sheets of drawings in which certain preferred structural embodiments incorporating the principle of the present invention are shown by way of illustrative examples.

DETAILED DESCRIPTION OF THE PREFERRED EMBODIMENTS

Figure 1:
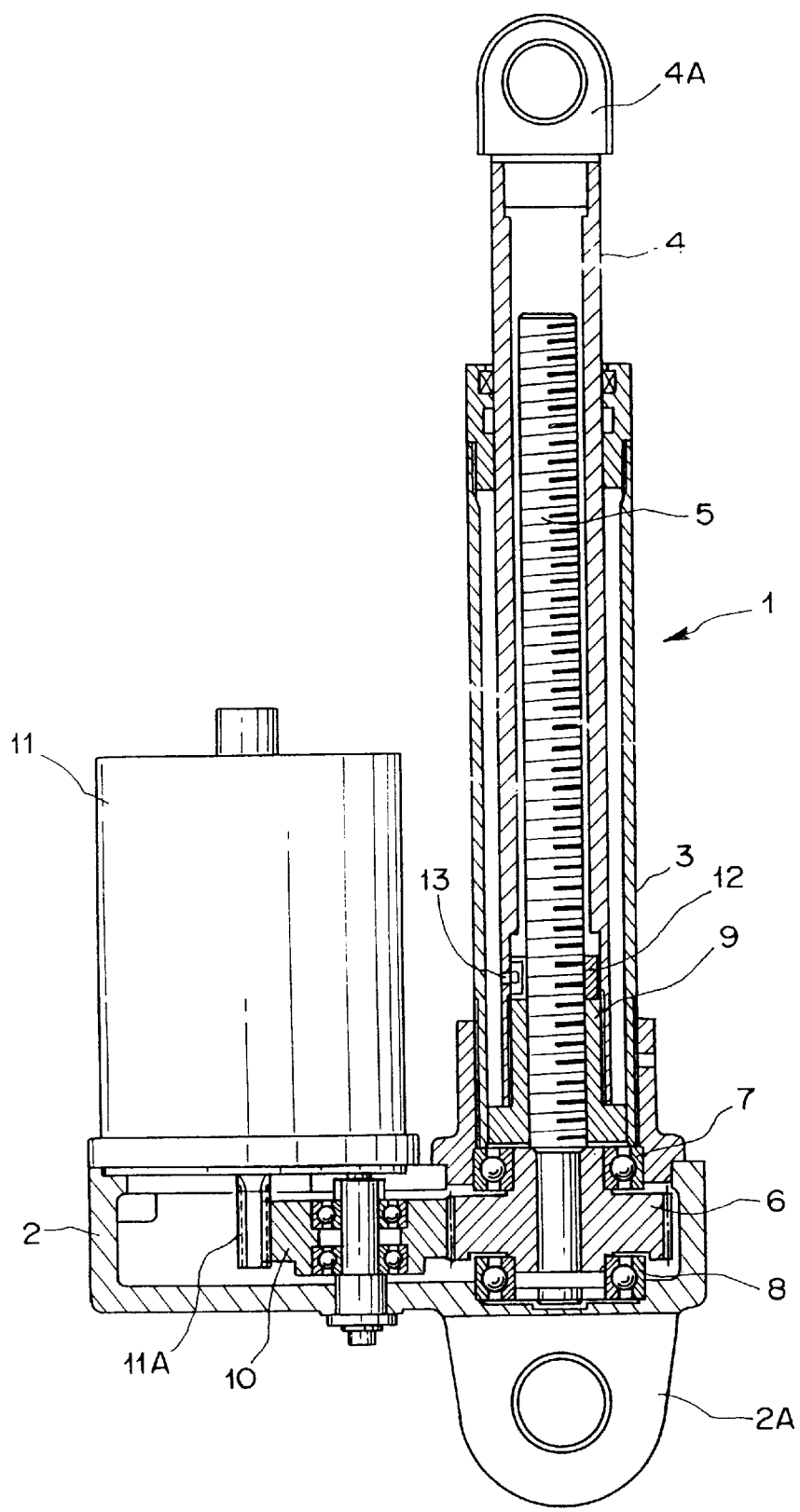
FIG. 1 is a longitudinal cross-sectional view showing a linear actuator having a drop prevention mechanism according to one embodiment of the present invention.

Certain preferred embodiments of the present invention will be described in greater detail with reference to the accompanying sheets of drawings in which like or corresponding parts are designated by the same reference characters throughout the several views.

FIG. 1 shows in cross section a linear actuator 1 including a drop prevention mechanism according to a first embodiment of the present invention. The linear actuator 1 includes a housing 2, an outer cylinder 3 firmly secured at one end to the housing 2, and an inner cylinder 4 fitted in the outer cylinder 3 such that the inner cylinder 4 reciprocates for projection and retraction with respect to the outer cylinder 3.

A drive screw shaft 5 is rotatably mounted by a pair of ball bearings 7 and 8 to the housing 2 via a driven gear 6 firmly connected to a base end (lower end in FIG. 1) of the drive screw shaft 5. The drive screw shaft 5 is threaded with a driven nut 9 firmly secured to a base end portion of the inner cylinder 4. A portion of the drive screw shaft 5 projecting upwardly from the driven nut 9 has a portion received inside the inner cylinder 4.

The driven gear 6 is in mesh with a pinion 11A via an intermediate gear 10 rotatably supported within the housing 2. The pinion 11A is formed integrally with an output shaft (drive shaft) of a rotating drive source 11. With this construction, when the pinion 11A rotates, a rotary motion of the pinion 11A is transmitted via the intermediate gear 10 at a reduced speed to the driven gear 6. This causes the drive screw shaft 5 to rotate at a fixed position relative to the housing 2.

The rotating drive source 11 may be a DC servomotor. However, from a safety standpoint, it is preferable to use an electric motor equipped with an electromagnetic brake which is designed to release the brakes when the motor is energized. Additionally, the mechanism for transmitting rotation from the drive shaft of the rotating drive source 11 to the drive screw shaft 5 should by no means be limited to the gear train described above, but may include other speed reducing mechanisms such as worm reduction gear mechanism.

The inner cylinder 4 to which the driven nut 9 is firmly connected is held non-rotatable relative to the outer cylinder 3. Accordingly, the driven nut 9, which is threaded with the drive screw shaft 5, moves backwards and forwards along the drive screw shaft 5 in response to rotation of the drive screw shaft 5 in the forward and reverse directions, thus producing retraction and projection of the inner cylinder 4 with respect to the respect to the outer cylinder 3.

The driven nut 9 shown in the illustrated embodiment is formed from a brass casting and has an internal screw thread of trapezoidal cross section. The drive screw shaft 5 is made of steel (S45C, as specified by Japanese Industrial Standard) and has an external screw thread of trapezoidal cross section.

The fore end of the inner cylinder 4 has a connecting portion 4A adapted to be connected to a support member (not shown) for supporting thereon loads, such as heavy things. The housing 2 includes a connecting portion 2A adapted to be connected to an external support member (not shown).

Figure 2:
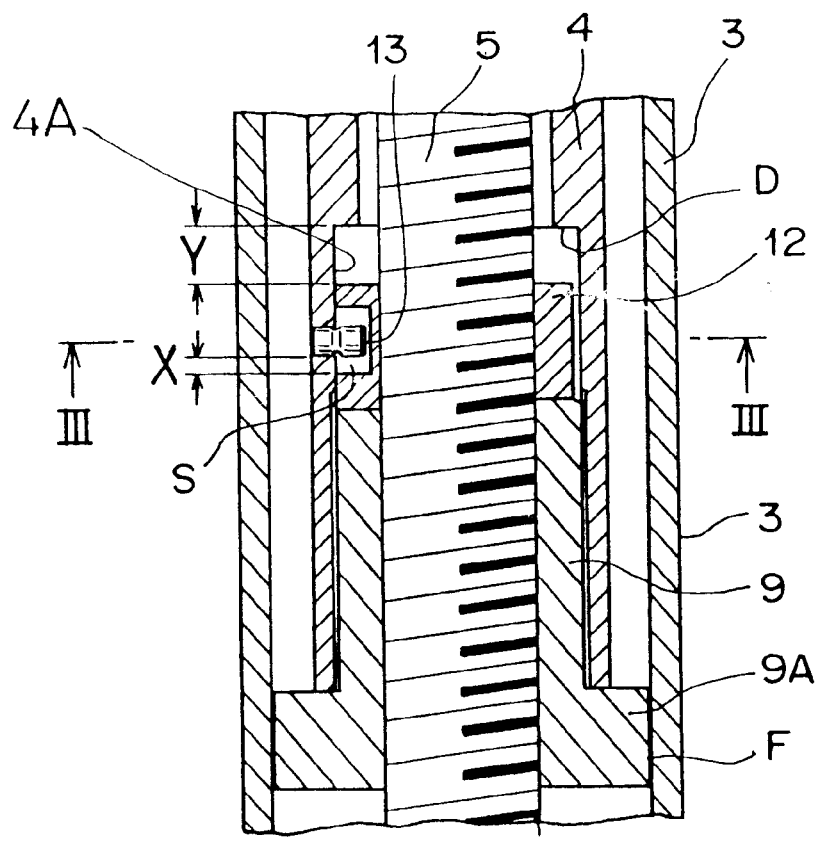
FIG. 2 is an enlarged view showing a portion of FIG. 1 including the drop prevention mechanism.
Figure 3:
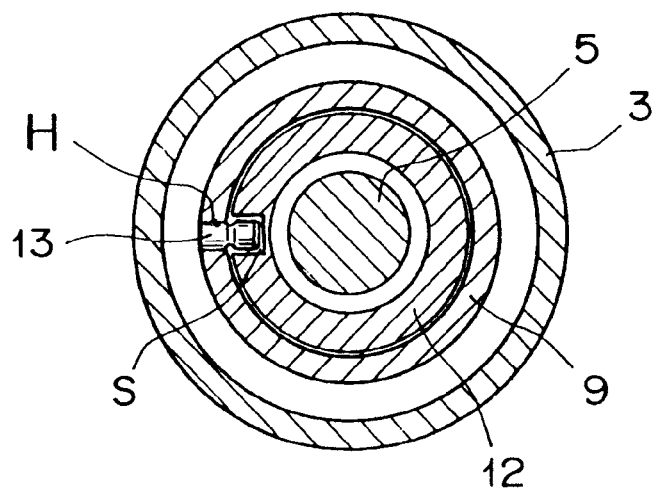
FIG. 3 is a cross-sectional view taken along line III—III of FIG. 2.

As shown in FIG. 2, the base end portion of the inner cylinder 4 is enlarged in its inside diameter so as to form a large inside diameter portion 4A. The driven nut 9 is secured to the large inside diameter portion 4A. The driven nut 9 has an annular flange 9A at an end. The flange is exposed to the outside of the inner cylinder 4 and has an outer peripheral surface F slidably guided by an inner peripheral surface of the outer cylinder 3.

Though not shown, the flange 9A of the driven nut 9 has an axial groove formed in the outer peripheral surface F. The non-illustrated axial groove is in sliding fit with an axial guide rail (not shown) formed on the inner peripheral surface of the outer cylinder 3 in parallel with the axis of the outer cylinder 3. The axial groove and the axial guide rail used in combination form an anti-rotation mechanism which functions to prevent rotation of the inner cylinder 4 and driven nut 9 relative to the outer cylinder 3 when the inner cylinder 4 and driven nut 9 reciprocate along the drive screw shaft 5.

A drop prevention nut 12 is threaded with the drive screw shaft 5 in close proximity to an inner end (upper end in FIG. 2) of the driven nut 9. The drop prevention nut 12 has a tubular form having a threaded axial central through-hole engaged with the drive screw shaft 5. The drop prevention nut 12 is received in the large inside diameter portion 4A of the inner cylinder 4 and located between the driven nut 9 and an annular step D at an inner end (upper end in FIG. 2) of the large inside diameter portion 4A of the inner cylinder 4.

A part of the inner cylinder 4, which faces an outer peripheral surface of the drop prevention nut 12, has a shear pin set hole H extending in a radial direction of the inner cylinder 4. A shear pin 13 is firmly fitted in the shear pin set hole H at one end (outer end in FIG. 2) thereof so that the shear pin 13 projects, in a cantilevered fashion, from the inner cylinder 4 in a radial inward direction.

The drop prevention nut 12 has an axial shear pin guide groove S formed in the outer peripheral surface thereof at a position opposed to the shear pin 13 so that the shear pin guide groove S slidably receives therein a projecting free end portion of the shear pin 13.

The shear pin guide groove S is a blind groove closed at opposite ends. The respective relative positions between the driven nut 9 and the drive screw shaft 5 and between the drop prevention nut 12 and the drive screw shaft 5 are initially set such that the shear pin 13 is separated or spaced from both upper and lower closed ends of the axial shear pin guide groove S, and the distance X of a space between the lower closed end (end wall) of the shear pin guide groove S and the shear pin 13 is smaller than the distance Y of a space between an upper end face of the drop prevention nut 12 and the annular step D at an upper end of the large inside diameter portion 4A of the inner cylinder 3. Thus, in the initial state, no thrust load is transmitted from the inner cylinder 4 or the driven nut 9 to the drop prevention nut 12.

The drop prevention nut 12 non-rotatably connected by the shear pin 13 to the inner cylinder 4 forms the drop prevention mechanism according to the present invention.

The linear actuator 1 of the foregoing construction operates as follows.

In normal conditions in which the driven nut 9 is free from wear and tear, when the drive screw shaft 5 is rotated in the forward or the reverse direction by the rotating drive source 11, the driven nut 9 engaged with the drive screw shaft 5 moves backwards or forwards along the drive screw shaft 5 to thereby cause the inner cylinder 4 to retract or project with respect to the outer cylinder 3. With this reciprocating movement of the inner cylinder 4, the linear actuator 1 can achieve lifting or lowering of heavy loads carried on the non-illustrated support member connected to the connecting portion 4A.

In this instance, since the drop prevention nut 12 is held non-rotatable by the shear pin 13 slidably fitted in the shear pin guide groove S, the drop prevention nut 12 moves along the drive shaft 5 in unison with the driven nut 9. During that time, the shear pin 13, which is slidable along the shear pin guide groove S, is not subjected to thrust forces or loads. All the loads acting on the inner cylinder 4 are born by the driven nut 9 and, hence, the drop prevention nut 12 is kept substantially free from wear.

Figure 4A:
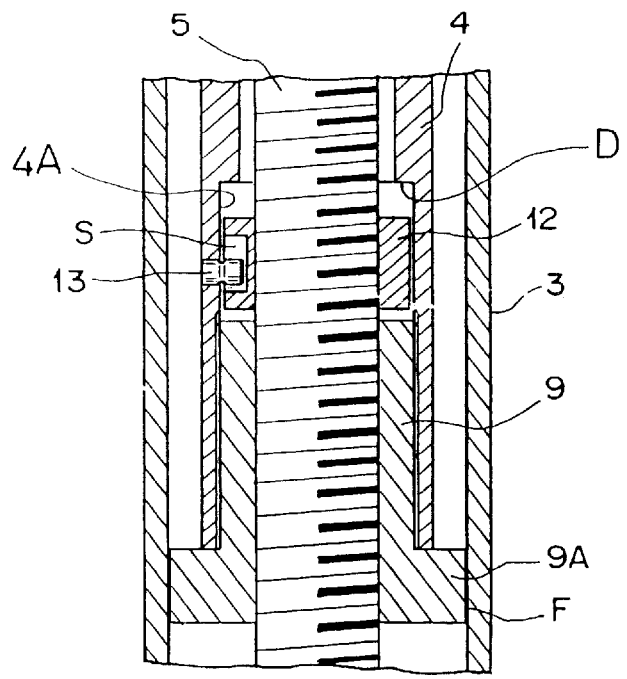
FIG. 4A is a view similar to FIG. 2, but showing the condition in which a shear pin on an inner cylinder is somewhat displaced from its original position due to wear of a driven nut attached to the inner cylinder.

In the case where the driven nut 9 is showing wear or damage sustained from continuous use, the position of the driven nut 9 relative to the drop prevention nut 12 is lowered under the effect of thrust forces or loads acting on the inner cylinder 4, as shown in FIG. 4A. With this downward shift or displacement of the driven nut 9, the shear pin 13 is displaced downwards along the shear pin guide groove S.

Figure 4B:
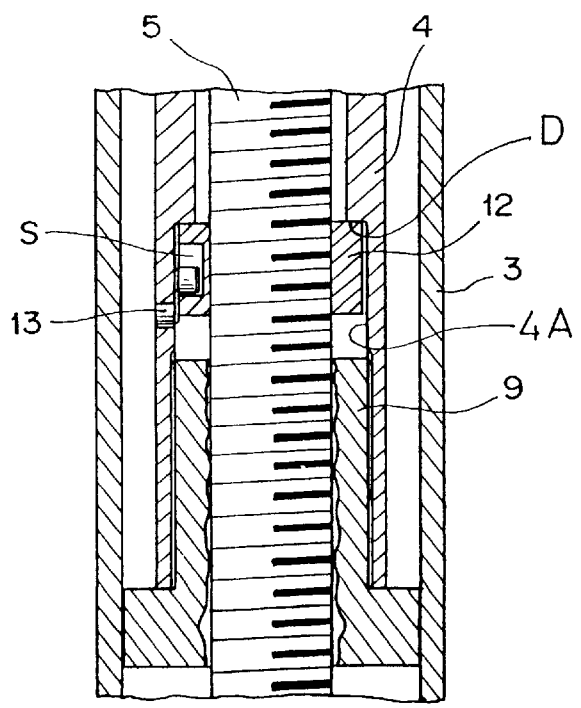
FIG. 4B is a view similar to FIG. 2, but showing the condition in which shearing of the shear pin occurs due to wearing-out of the driven nut.

When the internal screw thread of the driven nut 9 is worn out as shown in FIG. 4B, the driven nut 9 is allowed to slip down along the drive screw shaft 5, causing sudden dropping of the inner cylinder 4 as the inner cylinder 4 is subjected to the load acting in the axial direction thereof. As a result of such sudden dropping of the inner cylinder 4, the shear pin 13 is broken or sheared when the projecting free end portion of the shear pin 13 strikes against the lower end wall of the shear pin guide groove S in the drop prevention nut 12 engaged with the drive screw shaft 5. With the shear pin 13 thus broken, the inner cylinder 12 is allowed to further descending along the driven screw shaft 5. The downward movement of the inner cylinder 4 is prevented when the annular step D formed at the upper end of the large inside diameter portion 4A of the inner cylinder 4 comes in face-to-face contact with the upper end face of the drop prevention nut 12.

After the shear pin 13 is broken, drop prevention nut 12 threaded with the drive screw shaft 5 is rotated along with the drive screw shaft 5 due to the friction acting between the drop prevention nut 12 and the drive screw shaft 5. Thus, rotation of the drive screw shaft 5 is no longer transmitted to the inner cylinder 4 ether through the driven nut 9 or through the drop prevention nut 12, and projection or retraction of the inner cylinder does not take place. This makes it possible for the human operator to visually determine an operation failure of the linear actuator 1.

Although in the embodiment described above the shear pin 13 is fixed in cantilevered fashion to the inner cylinder 4 and the shear pin guide groove S is formed in the drop prevention nut 12 for slidably receiving therein a projecting free end portion of the shear pin 13, the shear pin 13 may alternatively be fixed in cantilevered fashion to the drop prevention nut 12 and the shear pin guide groove S slidably receiving therein a projecting free end of the shear pin 13 is formed in the inner cylinder 4.

In the embodiment described above, the linear actuator 1 is constructed to bear the load applied to the upper end of the inner cylinder 4. The vertical position of the linear actuator 1 shown in FIG. 1 may be inverted so that the inner cylinder 1 is reciprocally movable to project downwards. In this arrangement, it may be possible to provide a hook at a lower end of the inner cylinder 4 so that the linear actuator can be used as a hoist or crane for handling heavy loads or things. In this application mode, when the driven nut 12 is damage or broken, shearing of the shear pin 13 takes place before the driven nut 9 comes in face-to-face contact with an end face of the drop prevention nut 12. Upon abutment between the driven nut 9 and the drop prevention nut 12, further downward movement of the inner cylinder 4 is prevented by the drop prevention nut 12.

Figure 5:
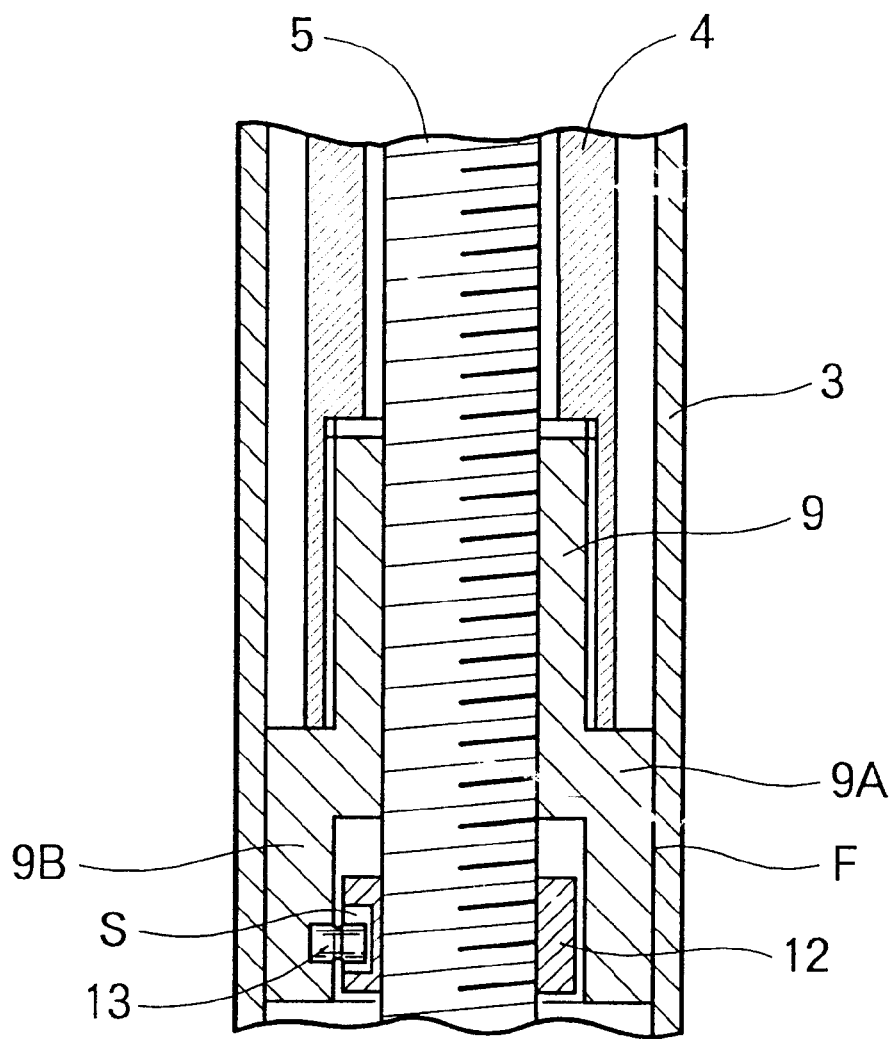
FIG. 5 is a view similar to FIG. 2, showing a drop prevention mechanism according to another embodiment of the present invention.

FIG. 5 shows in cross section a portion of a linear actuator including a drop prevention mechanism according to a second embodiment of the present invention. This embodiment differs from the first embodiment described above in that a drop prevention nut 12 threaded with the drive screw shaft 5 is disposed below the driven nut 9. The driven nut 9 has a coaxial cylindrical wall 9B formed integrally with the flange 9A and surrounding the outer peripheral surface of the drop prevention nut 12. The shear pin 13 is fixed at one end to the cylindrical wall 9B of the driven nut 9 and projects from the cylindrical wall 9B in a radial inward direction of the inner cylinder 4. A shear pin guide groove S is formed in the outer peripheral surface of the drop prevention nut 12 in parallel relation to the axis of the drop prevention nut 12 and slidably receives therein a projecting free end portion of the shear pin 13.

The respective relative positions between the driven nut 9 and the drive screw shaft 5 and between the drop prevention nut 12 and the drive screw shaft are determined such that in the initial condition, the projecting free end portion of the shear pin 13 is separated from opposite end walls of the shear pin guide groove S, and the distance between the lower closed end of the shear pin guide groove S and the shear pin 13 is smaller than the distance between the flange 9A of the driven nut 9 and an upper end face of the drop prevention nut 12.

With this arrangement, the drop prevention nut 12 is kept free from thrust forces acting on the inner cylinder 4 and the driven nut 9 until shearing of the shear pin 13 takes place. The drop prevention nut 12 non-rotatably connected by the shear pin 13 to the driven nut 9 forms the drop prevention mechanism according to the present invention.

Operation of the drop prevention mechanism of the second embodiment is substantially the same as operation of the first embodiment and a further description thereof can, therefore, be omitted.

Although in the embodiments described above only one shear pin is used, plural shear pins may be used. In place of directly hoisting the heavy loads, the inner cylinder may be used to actuate an arm of an arm crane which is attached to the fore end of the inner cylinder. The linear actuator may be arranged with the inner cylinder disposed horizontally or at an inclined position.

As described above, according to a linear actuator equipped with a drop prevention mechanism according to the present invention, when a driven nut, which is engaged with a drive screw nut to sustain an axial force or load applied to an inner cylinder, is damaged or otherwise broken, harmful sudden drop of the inner cylinder can be prevented reliably and immediately. This is particularly advantageous when the driven nut is broken during hoisting operation of the linear actuator because heavy loads or things supported by the inner cylinder can be stably held in position against drop.

When the driven nut is broken, the inner cylinder or the driven nut is separated from the drop prevention nut due to shear of a shear pin. The drop prevention nut is then rotated along with the driven screw shaft due to the friction therebetween and has no function to produce reciprocating movement of the inner cylinder. This makes it possible for the human operator to visually determine an operation failure of the linear actuator. The linear actuator cannot resume its operation unless the broken shear pin is replaced with a new shear pin.

Obviously, various minor changes and modifications of the present invention are possible in the light of the above teaching. It is therefor to be understood that within the scope of the appended claims the present invention may be practiced otherwise than as specifically described.

What is claimed is:

1. A linear actuator comprising:

a housing;

an outer cylinder firmly secured to said housing;

an inner cylinder fitted in said outer cylinder such that said inner cylinder can project from and contract within said outer cylinder while it is prevented from rotating relative to said outer cylinder;

a drive screw shaft rotatably supported by said housing and driven by a rotating drive source for rotation at a fixed position;

a driven nut secured to said inner cylinder and threaded with said drive screw shaft for causing said inner cylinder to project from or retract within said outer cylinder in response to rotation of said drive screw shaft;

a drop prevention nut threaded with said drive screw shaft in proximity to said driven nut;

a shear pin secured at one end to, and projecting in a radial direction from, one of said drop prevention nut and said inner cylinder or said driven nut; and the other of said drop prevention nut and said inner cylinder or said driven nut having an axial shear pin guide groove in which a projecting free end portion of said shear pin is slidably received, wherein said shear pin is designed to be sheared by engagement with an end wall of said shear pin guide groove when said inner cylinder and said driven nut are displaced relative to said drop prevention nut in a direction of a load acting on said inner cylinder, and wherein upon shearing of said shear pin, said drop prevention nut sup ports thereon said inner cylinder or said driven nut to thereby keep said inner cylinder in position against drop.

2. A linear actuator according to claim 1, wherein said inner cylinder has one end portion enlarged in its inside diameter to form a large inside diameter portion and an annular step at an end of said large diameter portion, said driven nut is secured to said one end portion of said inner cylinder with part received in said large inside diameter portion, and said drop prevention nut is received in said inside large diameter portion and disposed between said driven nut and said annular step, said drop prevention nut being engageable with said annular step to stop dropping of said inner cylinder when said shear pin is sheared.

3. A linear actuator according to claim 2, wherein said shear pin is secured to said inner cylinder, and said axial shear pin guide groove is formed in said drop prevention nut.

4. A linear actuator according to claim 1, wherein said driven nut is secured to an end of said inner cylinder, and said drop prevention nut is disposed on a side of said driven nut which is opposite from said inner cylinder, said driven nut having a coaxial cylindrical wall surrounding said drop prevention nut, said drop prevention nut being engageable with said driven nut to stop dropping of said inner cylinder when said shear pin is sheared.

5. A linear actuator according to claim 4, wherein said shear pin is secured to said cylindrical wall of said driven nut, and said axial shear pin guide groove is formed in said drop prevention nut.

\* \* \* \* \*